US011858396B2

(12) United States Patent
Meisier

(10) Patent No.: US 11,858,396 B2
(45) Date of Patent: Jan. 2, 2024

(54) VEHICLE HEADREST SAFE

(71) Applicant: Irving Meisier, Birmingham, AL (US)

(72) Inventor: Irving Meisier, Birmingham, AL (US)

(73) Assignee: The Headrest Safe IP Company, LLC, Birmingham, AL (US)

(*) Notice: Subject to any disclaimer, the term of this patent is extended or adjusted under 35 U.S.C. 154(b) by 42 days.

(21) Appl. No.: 17/541,407

(22) Filed: Dec. 3, 2021

(65) Prior Publication Data
US 2023/0100808 A1 Mar. 30, 2023

Related U.S. Application Data

(60) Provisional application No. 63/250,452, filed on Sep. 30, 2021.

(51) Int. Cl.
*B60N 2/879* (2018.01)
*B60N 2/80* (2018.01)
*B60R 7/04* (2006.01)
*B60R 7/08* (2006.01)

(52) U.S. Cl.
CPC .............. *B60N 2/879* (2018.02); *B60N 2/80* (2018.02); *B60R 7/043* (2013.01); *B60R 7/087* (2013.01); *B60N 2002/899* (2018.02)

(58) Field of Classification Search
CPC ......... B60N 2/879; B60R 7/043; B60R 7/087; F41C 33/06; E05G 1/005
See application file for complete search history.

(56) References Cited

U.S. PATENT DOCUMENTS

| 2,132,323 | A  | * | 10/1938 | Sander ..................... B60R 7/14 224/281 |
| 8,186,188 | B1 | * | 5/2012  | Brown ..................... E05G 1/005 109/45 |
| 9,278,649 | B2 | * | 3/2016  | McGoldrick ........... E05G 1/026 |
| 10,279,915 | B2 | * | 5/2019  | Porter ..................... E05B 83/28 |
| 10,370,889 | B2 | * | 8/2019  | Rueda ....................... E05G 1/04 |
| 10,406,957 | B2 | * | 9/2019  | Faruque ................... B60N 2/90 |
| 10,850,672 | B1 | * | 12/2020 | Meisler ..................... B60R 7/14 |
| 11,092,407 | B2 | * | 8/2021  | Bernkrant ............ F41C 33/0272 |
| 11,554,722 | B1 | * | 1/2023  | Mothersele ............. F41C 33/06 |
| 2012/0298018 | A1 | * | 11/2012 | McCabe ............. E05B 17/0025 109/51 |
| 2017/0050545 | A1 | * | 2/2017  | Aguilar Ruelas ...... B60N 2/809 |
| 2019/0161021 | A1 | * | 5/2019  | Klein ..................... B60R 7/087 |
| 2022/0281387 | A1 | * | 9/2022  | Meisier ..................... B60R 7/14 |

* cited by examiner

*Primary Examiner* — David R Dunn
*Assistant Examiner* — Tania Abraham
(74) *Attorney, Agent, or Firm* — Baker Donelson Bearman Caldwell & Berkowitz, PC

(57) ABSTRACT

An automobile headrest safe includes an exterior and a container positioned within the interior of the exterior housing. The container is removable from the exterior housing so that the container may be completely removed from the exterior housing and transported separately from the exterior housing. The container includes a body portion having an open end and a pivotal, reciprocating side door. The container may include a carrying handle. The pivotal side door is coupled to a lock. The headrest safe may be coupled to the automobile seat through a mounting system having a mounting plate coupled to the exterior housing and mounting posts extending from the mounting plate.

17 Claims, 4 Drawing Sheets

VEHICLE HEADREST SAFE

CROSS REFERENCE TO RELATED APPLICATIONS

This application claims the benefit of U.S. Provisional Patent Application No. 63/250,452 filed Sep. 30, 2021 and entitled "Automobile Headrest Safe", and is incorporated herein by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

TECHNICAL FIELD

The present disclosure relates to safes, and more particularly, the disclosure relates to a gun safe which is found in a vehicle.

BACKGROUND OF THE INVENTION

Safes have been used for decades to allow for the storage of items, such as guns while preventing the unauthorized access to the guns therein. Many safes use a metal enclosure having a lock. The lock may be in the form of a combination lock, key lock, or a more modern biometric lock which is access through a person's fingerprint or the like.

Guns are oftentimes transported or stowed inside cars for the protection of the occupant. While guns may be stowed within a console or glove box of a car, these are not considered to be a gun safe as they do not have the necessary lock and tamper resistance capabilities. A car storage compartment has also been designed to be included into the headrest of a seat, as shown in Korean Patent Application KR19980001253. However, here again, the headrest storage compartment does not include a lock or the tamper resistant capabilities to prevent access to a gun therein. Furthermore, the access to the interior area of the storage compartment is difficult for a driver.

Some gun safes have been adapted to be used within automobiles or cars. These gun safes may be in the form of a metal box which is simply secured to the car, such as that shown in U.S. Pat. No. 5,996,865. Gun safes have also been designed to be incorporated into the glove box or console of a car, as shown in U.S. Patent Application No. 20190102963. A gun safe has also been designed to be incorporated into the structure of a car's sun visor, as shown in U.S. Pat. No. 10,232,790. While these gun safes provide a secure structure for the safe storage of a gun, they require the use of multiple hands to operate and are not the most direct access to the gun within the safe.

Many states have laws that regulate the transportation of a gun and/or the manner in which a gun is stored in a house or other structure. Some laws require a gun to be kept within the trunk of the vehicle or within a locked container or safe during the transportation within a vehicle. Some laws also require the gun to be kept in a safe during its transportation to and from the vehicle, which would prevent the use of a safe that is securely mounted within the vehicle.

Accordingly, it is seen that a need remains for a gun safe which is incorporated into a vehicle for the safe storage yet easy access to a gun therein. It is to the provision of such therefore that the present invention is primarily directed.

SUMMARY OF THE INVENTION

A gun safe adapted to be mounted to a vehicle seat, the safe comprises an exterior housing having a front surface oriented relative to the front surface of the vehicle seat, a rear surface oppositely disposed from the front surface, two oppositely disposed side surfaces extending between the front surface and the rear surface, a top surface extending between the front surface and the rear surface, and a bottom surface extending between the front surface and the rear surface. One side surface has a pivotal door portion. The gun safe also has a container removably mounted within the exterior housing so that the container may be completely separated from the exterior housing. The container has a main portion and a container door pivotally mounted to the main portion for reciprocal movement between a closed position and an open position. The container also has a lock coupled to the container door to prevent the opening of the container door when in a locked position and to allow the opening of the container door when in an unlocked position.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Figure 1:
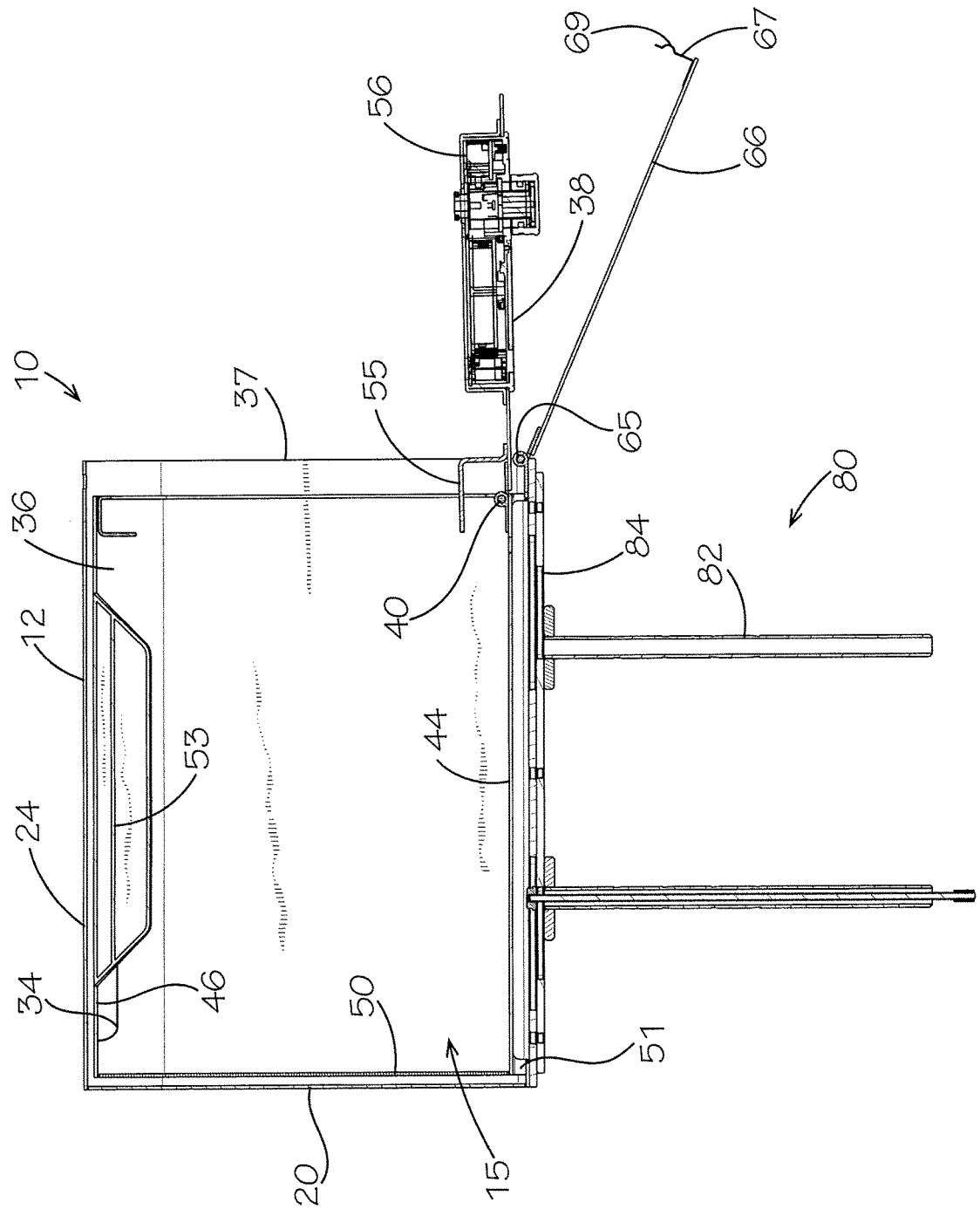
FIG. 1 is a cross-sectional side view of a vehicle headrest safe embodying principles of the invention in a preferred form, shown with the exterior housing door and container door in an open position.

With reference next to the drawings, there is a shown a vehicle headrest safe 10, and particularly a vehicle headrest gun safe 10 in a preferred form of the present invention. The headrest safe 10 is used in conjunction with the seat S of the automobile, motorcycle, truck, or any other vehicle having a seat, collectively referenced hereinafter as automobile, and preferably is aesthetically designed to be substituted for the standard seat headrest of the automobile to provide a uniform appearance to the automobile's interior.

The headrest safe 10 includes an exterior housing 12 which is made of a material and shaped to conform to or resemble the standard, stock headrest of that particular automobile. The exterior housing 12 defines an interior chamber 15. The exterior housing 12 includes a front surface 16 which faces forward with respect to the automobile, a rear surface 18 facing rearwardly, a left side surface 20, a right side surface 22, a top surface 24 and a bottom surface 26. The left and right side surfaces 20 and 22 face laterally with respect to the automobile so that one side surface faces either the driver when mounted to the passenger seat or faces the passenger when mounted to the driver's seat. The exterior housing 12 may be comprised of a flexible exterior cover or covering and a soft cushion or filler material underlying the cover. The exterior housing 12 may also has a metal or rigid sub-housing to provide structural support. The interior surface of left side wall surface 20 may include a padded or resilient layer. The right side surface 22 includes a pivotal housing door 66 that moves between an open position and a closed position through a hinge 65.

A hollow metal enclosure, housing, box, or container 34 is positioned within the interior of the exterior housing 12 and is removable from the exterior housing 12 so that the container 34 may be completely removed from the exterior housing 12 and transported separately from the exterior housing 12. The container 34 includes a tubular main or body portion 36 having an open end or opening 37 and a pivotal, reciprocating side door 38 having a hinge 40 which pivots the side door 38 from a closed position closing the body portion opening 37 (shown in phantom lines in FIG. 1), to an open position allowing access to the interior of the container 34 through opening 37, shown in FIG. 2. The container main portion 36 has a bottom wall 44, top wall 46, two side walls 48, and an end wall 50 oppositely disposed from the side door 38. The bottom wall 44 may have soft or resilient pads or feet 51 to cushion the container 34. The container 34 may include a recessed carrying handle 53. The resilient feet and resilient layer aid in providing a snug fit between the exterior housing 12 and the container 34 when the container 34 is mounted within the exterior housing 12, which also aids in eliminating any rattling or noise occurring as a result of contact between these components.

The pivotal side door 38 includes a lock or locking device 56 that prevents the unauthorized opening of the side door 38. The lock 56 may be a biometric lock having a fingerprint reader 58, a number combination lock, a key lock, of any other conventionally known type of lock. The lock 56 maintains the side door 38 in its closed or locked position.

Figure 2:
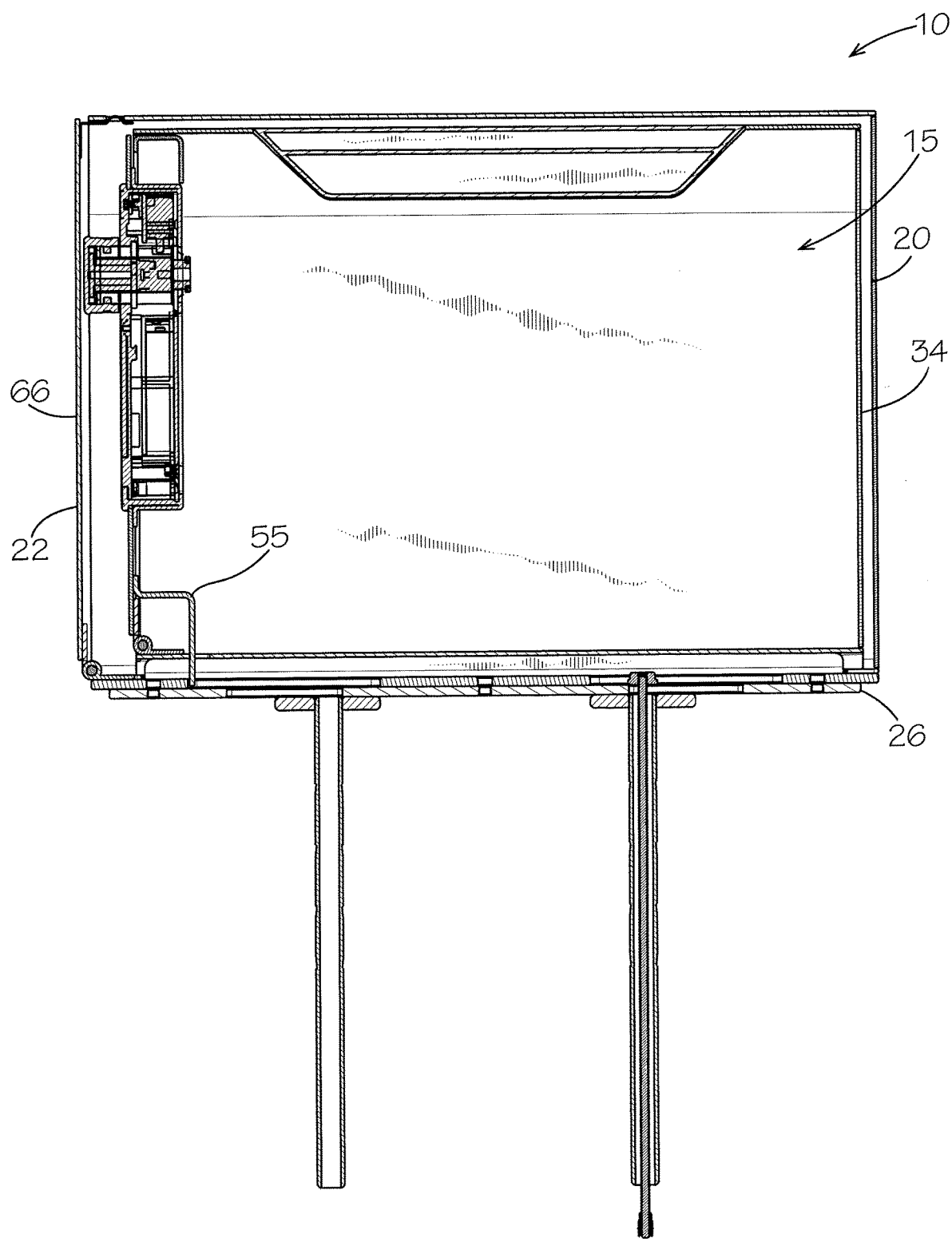
FIG. 2 is a cross-sectional side view of the vehicle headrest safe of FIG. 1, shown with the exterior housing door and container door in a closed position.
Figure 3:
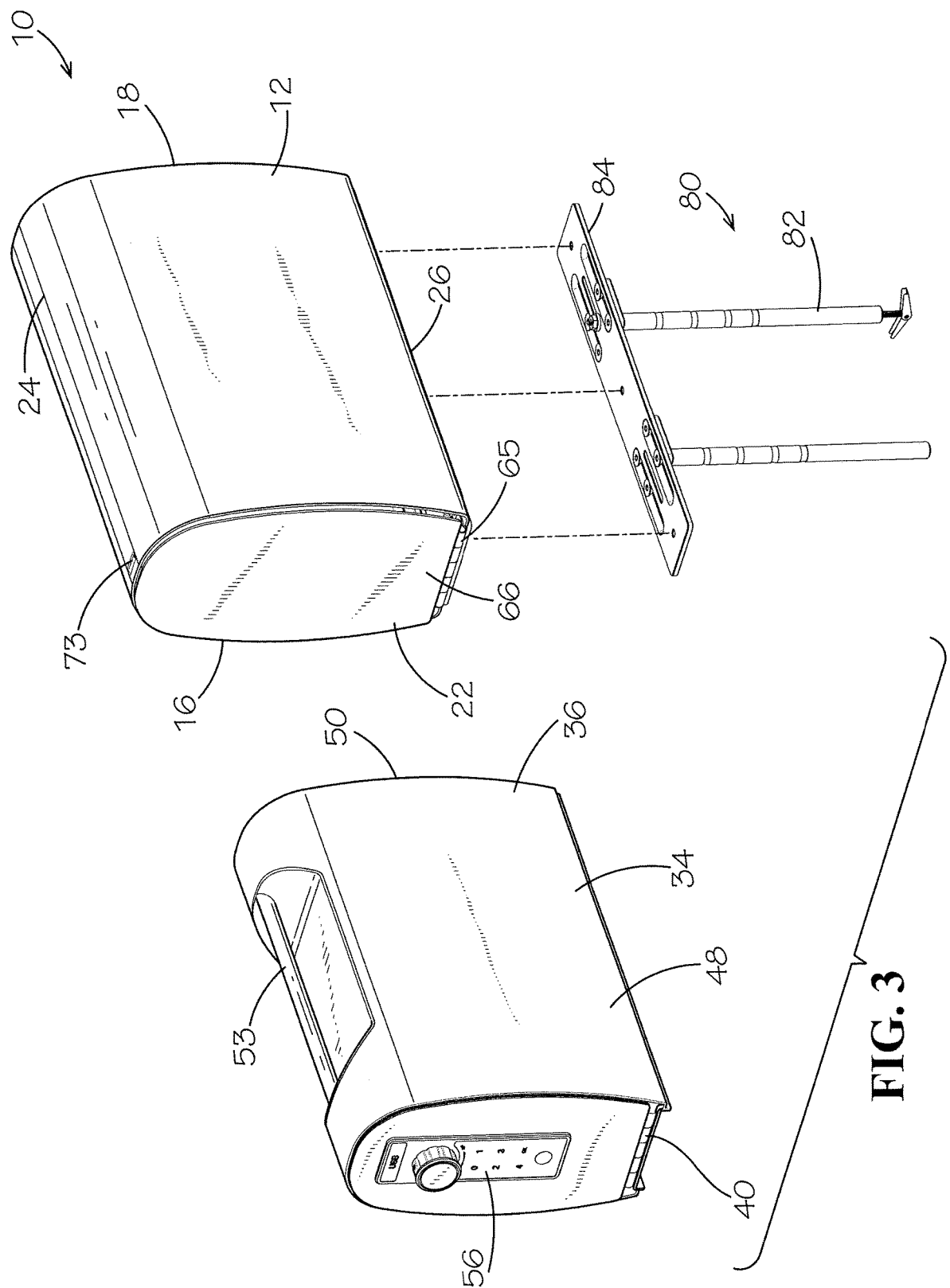
FIG. 3 is a perspective, exploded view of the vehicle headrest safe of FIG. 1.
Figure 4:
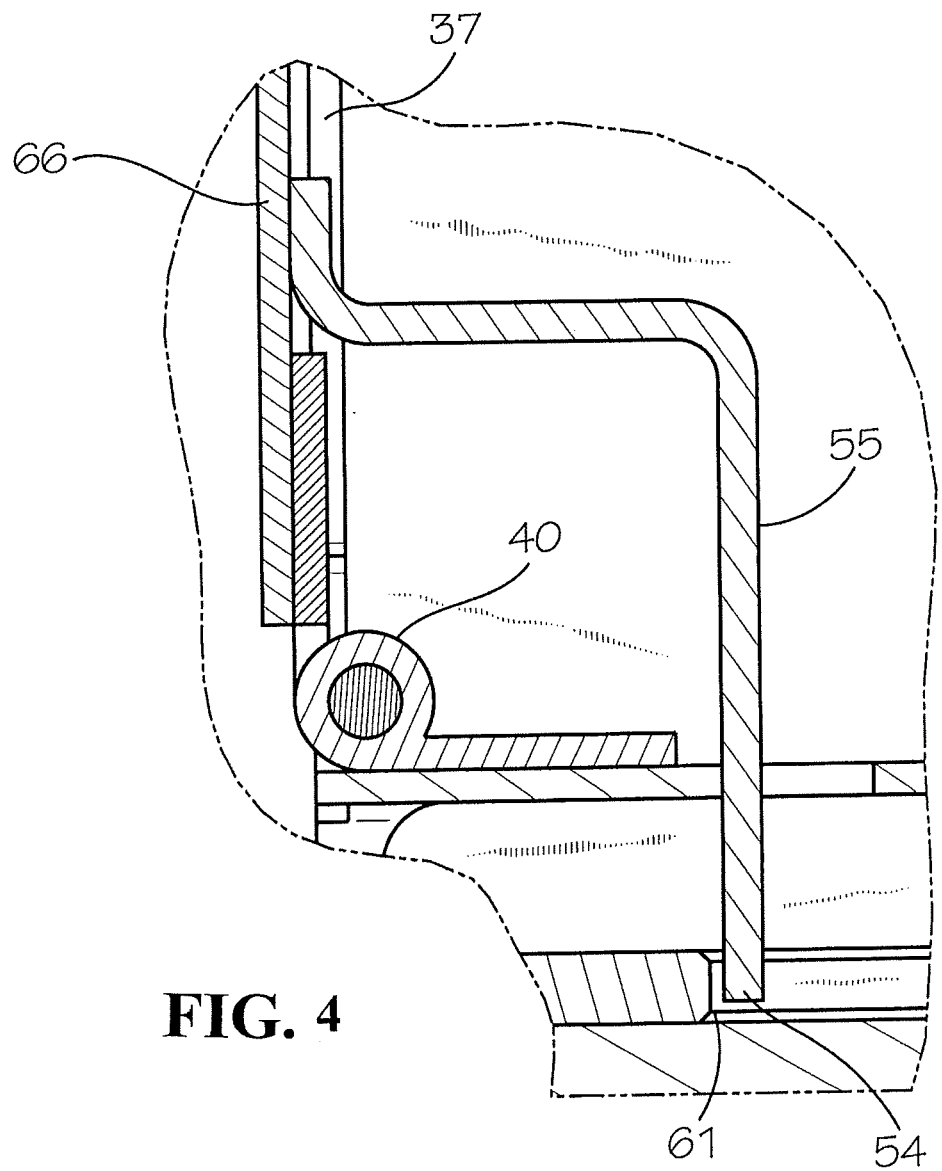
FIG. 4 is a cross-sectional view of a portion of the vehicle headrest safe of FIG. 1.
Figure 5:
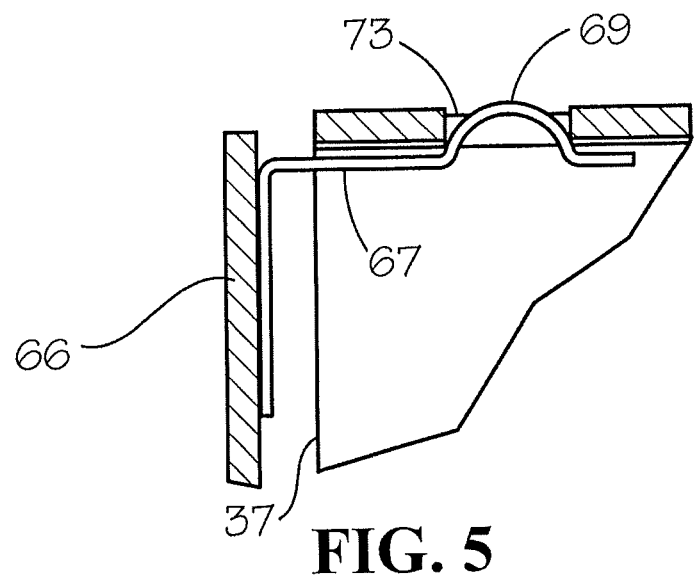
FIG. 5 is a cross-sectional view of a portion of the vehicle headrest safe of FIG. 1.

The container 34 also have an L-shaped releasable catch 55 mounted to the interior side of the side door 38. The end 54 of the releasable catch resides within a catch receiver 61 when the side door 38 is in a closed position, as shown in FIGS. 2 and 4, and resides outside the catch receiver 61 when the side door 38 is in an open position, as shown in FIG. 1. With the release catch 55 residing within the catch receiver 61, the container 34 cannot be removed from the exterior housing 12.

The pivotal housing door 66 overlies the container side door 38. The housing door 66 and underlying door 38 are preferably located on the left side surface 20 of a passenger seat so that the housing door 66 is facing the driver of the automobile, assuming a left side driver's seat position. Of course, should the headrest safe be mounted to a driver's seat, the housing door 66, and underlying side door 38, should be positioned on the right side surface 22 facing the passenger positioned on the passenger seat. The housing door 66 moves independently of the container side door 38 between a closed or locked position and an open position. The housing door 38 includes a resilient or spring biased catch or release 67 having a detent 69 that is releasably positionable within a detent or release hole 73 extending through the top surface 24 of the exterior housing 12.

The headrest safe 10 may be coupled to the automobile seat through any conventionally known mounting means, and preferably couples to the seat through the same means as the original manufactured car seat headrest. For example, the headrest 10 may be coupled to the seat through a single mounting post, double mounting posts, or the like. The mounting means should be robust enough to prevent the theft of the headrest safe by its forcible removal from the seat. The drawings illustrate a double mounting post assembly 80 having two posts 82 and a mounting plate 84 coupled to the bottom surface of the exterior housing 12.

In use, the headrest safe 10 is coupled to the seat S of an automobile in the same position as the originally manufacturer's headrest. As the headrest safe is primarily configured to be accessible to the automobile driver, the headrest safe 10 is shown mounted to the passenger seat of the automobile of a left side driver position automobile. As such, the housing door 66 and underlying container door 38 are on the left side of the headrest facing the driver, although the opposite configuration may be made should the headrest safe 10 be mounted to the driver's seat for use and access by a passenger, again assuming a left drive automobile.

A person may place a pistol or gun G within the headrest safe 10 by opening the housing door 66 and container side door 38 through the unlocking activation of the lock 56, by placing a recognized, preprogrammed finger upon the fingerprint reader, entering the correct number combination, or utilizing a key. The actuation of the lock allows the side door 38 to pivotally move from its closed position to its open position. The side door 38 may then be moved to the closed or locked position to secure the pistol within the headrest safe 10. The housing door 66 is then moved to its closed position concealing the container 34 within a headrest structure that looks to be conventional. The housing door 66 is maintained in the closed position by the release catch detent 69 once again residing within exterior housing hole 73.

It should also be noted that the positioning of the side door 38 on the side of the headrest allows for direct access by the person in the oppositely disposed seat. This is a distinct advantage over the prior art wherein the door was positioned on the rear of the headrest, facing the back of the automobile. Such a rearward facing door does not allow for quick and access to the interior of the headrest container and the pistol therein.

The container 34 is released from the exterior housing 12 by the opening of the container door 38, which causes the end of the L-shaped releasable catch 55 to be removed from the catch receiver 61 thereby allowing manual removal of the container 34 from the exterior housing 12. The container 34 may then be removed from the exterior housing 12 and the housing door 66 is returned to its closed position. The placement of the L-shaped releasable catch 55 within the catch receiver 61 prevents the unauthorized removal or theft of the container 34 and the pistol therein, as the container lock must be released prior to container removal.

As an option, the container 34 may also include a removable strap to aid in carrying the container 34.

The removability of the interior container 34 from the exterior housing 12 allows the interior container 34 to be transported independently of the exterior housing 12 and the car in which the automobile headrest safe 10 is located. The interior container 34 may then be transported in a locked configuration anywhere, including into the home of the use. This allows for the gun to be safely locked at all times whether it is being transported by car, stowed in a house or other structure, or being transported between two locations wherein the gun must be locked in a safe at all times.

It should be understood that the term vehicle headrest has been used herein to describe the invention. However, in some vehicles the headrest may be better described as a backrest, such as with vehicles like motorcycles. As such, the term headrest is intended to include a backrest of some vehicles.

Variations of the headrest safe fall within the spirit of the claims, below. It will be appreciated that the inventions are susceptible to modification, variation, and change without departing from the spirit thereof.

The invention claimed is:

1. A safe adapted to be mounted to a vehicle seat, the safe comprising:
    an exterior housing, said exterior housing having a front surface oriented relative to the front surface of the vehicle seat, a rear surface oppositely disposed from said front surface, two oppositely disposed side surfaces extending between said front surface and said rear surface, a top surface extending between said front surface and said rear surface, and a bottom surface extending between said front surface and said rear surface, one said side surface having a pivotal door portion, and
    a container removably mounted within said exterior housing so that said container may be completely separated from said exterior housing, said container having a main portion and a container door pivotally mounted to said main portion for reciprocal movement between a closed position and an open position, said container also having a lock coupled to said container door to prevent the opening of said container door when in a locked position and to allow the opening of said container door when in an unlocked position, and said container includes a catch that locks said container to said exterior housing when said exterior housing door portion is in a closed position and unlocks said container from said exterior housing when said exterior housing door portion is in an open position.

2. The safe of claim 1 wherein said container telescopically fits within said exterior housing.

3. The safe of claim 1 wherein said catch includes an end, and wherein said exterior housing includes a catch receiver configured to receive said end of said catch.

4. The safe of claim 1 wherein said container includes a carrying handle.

5. The safe of claim 1 wherein said exterior housing includes a seat mount.

6. The safe of claim 5 wherein said seat mount includes a mounting plate coupled to said exterior housing and at least one post extending from said mounting plate.

7. A gun safe adapted to be mounted to a vehicle seat, the gun safe comprising,
    an exterior housing sized and shaped as a vehicle headrest, said exterior housing defining an interior chamber that is accessible through an opening, said exterior housing also having a door covering said opening, and
    an interior container configured to be received within said interior chamber of said exterior housing and removable from said interior chamber of said exterior housing, said interior container having a door with a lock to prevent the opening of said door when in a locked position, wherein said interior container includes a catch that locks said interior container to said exterior housing when said exterior housing door is in a closed position and unlocks said container from said exterior housing when said exterior housing door is in an open position.

8. The gun safe of claim 7 wherein said interior container telescopically fits within said exterior housing.

9. The safe of claim 7 wherein said catch includes an end, and wherein said exterior housing includes a catch receiver configured to receive said end of said catch.

10. The safe of claim 7 wherein said container includes a carrying handle.

11. The gun safe of claim 7 wherein said exterior housing includes a seat mount.

12. The gun safe of claim 11 wherein said seat mount includes a mounting plate coupled to said exterior housing and at least one post extending from said mounting plate.

13. A vehicle seat safe comprising,
    a seat having a backrest portion and a seating portion, the backrest portion including a headrest having a door portion;
    an interior housing removably mounted within said headrest, said interior housing having a tubular body portion having an opening therein and an interior housing door pivotally mounted to said body portion to close said opening, and
    a lock coupled to said interior housing door to prevent the opening of said interior housing door when in a locked position and allowing the opening of said interior housing door when in an unlocked position,
    wherein said interior housing includes a catch that locks said interior housing to said headrest when said headrest door is in a closed position and unlocks said interior housing from said headrest when said headrest door is in an open position.

14. The safe of claim 13 wherein said interior housing telescopically fits within said headrest portion.

15. The safe of claim 13 wherein said catch includes an end, and wherein said headrest includes a catch receiver configured to receive said end of said catch.

16. The safe of claim 13 wherein said interior housing includes a carrying handle.

17. The safe of claim 13 wherein said headrest includes a seat mount having a mounting plate coupled to said headrest and at least one post extending from said mounting plate.

* * * * *